Patented Feb. 24, 1953

2,629,735

UNITED STATES PATENT OFFICE 2,629,735

REACTION OF ETHERS WITH ACIDS USING ION EXCHANGE RESINS CATALYSTS

Delmer L. Cottle, Highland Park, and David W. Young, Roselle, N. J., assignors to Standard Oil Development Company, a corporation of Delaware No Drawing. Application December 28, 1949, Serial No. 135,528

14 Claims. (Cl. 260—496)

This invention relates to a novel process for the production of esters from ethers and organic acids in which ion exchange resins are used as catalysts. More specifically, the invention is concerned with a liquid phase process in which the reactants are an organic acid and an organic ether and the catalyst is one selected from a group known as cationic exchange resins. It is preferred to employ these exchange resins in their acidic form.

This invention is for a novel process of carrying out the preparation of organic esters by reaction between ethers and acids, using ion exchange resins as catalysts.

In the earlier days of modern chemistry ethers were more expensive than alcohols and usually synthesized from the corresponding alcohols. In more recent times some of the ethers, in particular, diallyl, diethyl and diisopropyl ether have appeared as by-products from large scale chemical processes. Their utilization at times provides quite an economic problem and as a consequence their price frequently is considerably below those of corresponding alcohols. The conversion of these ethers to other and more useful products in the past often has failed because of their relative inertness in reactions with chemical agents. One of the objects of this invention is to provide a method whereby these ethers of low economic value can be transformed and upgraded into esters which are highly useful and valuable compounds.

It has been discovered that a number of marked advantages are obtained when, in reactions employing ethers and organic acids, an acid ion exchange resin is used rather than strong acid catalyst. The advantages which are obtained by the application of this new process include the ease of reaction and lack of degraded side products, the relatively low temperatures of the order of 40°–125° C., the convenience with which the catalyst can be removed from the reaction products, the lack of color bodies produced in the ester products by the presence of the resin catalyst, the freedom from inorganic acidity of the products, and the economical features of recycling the recovered solid resin catalyst for reuse in further reactions. Furthermore, the use of such cationic agents avoids any corrosion problems which may arise as a result of the use of acid catalysts. When the usual type acidic catalyst such as sulfuric acid or benzenesulfonic acid is used, for instance to catalyze the reaction between isopropyl ether and acetic acid, a sulfuric acid or other water-soluble catalyst may be washed out with water from the organic reaction products. It would be uneconomical to recover sulfuric acid from such a dilute solution. On the other hand it is uneconomical to discard the solution since acetic acid is also present, is water soluble, and would be lost in the process of discarding. These disadvantages of the present sulfuric acid process for making esters from ethers are entirely overcome by the process of the present invention in which a solid resin is employed as the catalyst. After the reaction is complete, the ester-acetic acid mixture can be directly decanted from the solid resin particles and thereafter worked up in the usual way employing any convenient method for the recovery of unreacted acetic or other organic material present in the reaction products. The use of resin catalysts has a marked advantage over vapor phase type catalysts in that the resin catalysts permit operation at much lower temperatures, for instance, at temperatures of approximately 40°–125° C., thus making it possible to capitalize on the more favorable ester yields which usually result at the lower temperatures. It has been found that, while various types of ion exchange resins may be used, they are preferably all of the cationic type and they are best employed in the acid form of the resin.

Apparently, the exact nature of the cation exchange resin is of relatively minor importance as long as it contains strongly acidic groups. Weak acidic catalysts, under some conditions, give ether splitting and subsequent formation of some ester products from the fragments. One of the primary requisites for a cation exchange resin which may be successfully employed in this process is relatively complete insolubility in the reaction mixture. The major portion of these ion exchange resins which are commercially available show complete insolubility in water, alcohol, and other organic solvents which might be present in reaction mixtures of ethers and organic acids. In general, this insolubility in ion exchange resins is achieved by cross-linking the resin skeleton into a molecular network such as that found in a thermosetting plastic. Alternatively, the base of the ion exchange resin catalyst may be an insoluble naturally-occurring product such as coal, lignite, or peat. Thus, the thermosetting plastics are characterized by their insolubility in all solvents and by their stability over long periods of time to chemical reactants and to heat. These are exactly the properties which are most desired in a resin to be used as a catalyst in the reaction of ethers with acids and hence the common thermosetting resins such as phenol formaldehyde, melamine formaldehyde, urea formaldehyde, etc., form the basis for the more useful insoluble ion exchange resins.

The more common types of exchange resins used as bases for the ion exchange catalysts are the carbon-carbon skeletons and the carbon-nitrogen skeletons.

To this basic network skeleton, there must be attached ionic groups in order to produce an exchange resin. Thus, cation exchange resins which are useful for catalysts may be made with sulfonic acid groups, carboxylic acid groups, phenolic hydroxy groups, and thio groups. In general, one might suspect that the resin network base should be loaded with as many cationic active groups as possible in order to achieve maximum catalytic reaction. This may be true except that certain undesirable qualities, such as the extent of swelling, depend on the concentration of the active groups in a resin as well as upon the extent of the cross-linking of the network. All ion active groups tend to solubilize the structure while the cross-links have the opposing effect, that of preventing solution. Therefore, a compromise is usually required between the number of active groups directly affecting the cationic catalyst capacity and the complex network linkages affecting the swelling and solubility of the resin in the reaction mixture. Various types of specific resins have been tested experimentally and have been found to be successful in their application to reactions involving ethers and acids. The resins containing sulfonic acid groups have been found to be particularly effective. Among these useful catalyst resins are found the sulfonated coal products, the phenol-formaldehyde sulfonates in which the sulfonic acid groups are attached to the benzene nuclei in the resin through a methylene group and the nuclear sulfonated resins in which the sulfonic acid groups are attached directly to the benzene rings. Also useful are the sulfonated resinous polymers of coumarone-indene with cyclopentadiene, sulfonated polymers of coumarone-indene with furfural, sulfonated polymers of coumarone-indene with cyclopentadiene and furfural, and sulfonated polymers of cyclopentadiene with furfural.

Thus, the organic cationic exchange catalysts which are useful in the present process of preparing esters from ethers and organic acids are high molecular weight, water-insoluble resins or carbonaceous materials containing at least one functional group selected from the series sulfonic acid, phenolic, hydroxyl, or carboxylic acid groups. A number of these useful catalysts are marketed as water softener agents or so-called base exchangers. These materials are usually commercially available in neutralized forms and for best results as catalysts in this process, they must be activated by treatment with acid, such as hydrochloric or sulfuric acid, and thereafter water-washed to remove sodium, sulfate, and chloride ions as well as excess hydrogen ions. All of these resin catalysts may lose their catalytic efficiency upon long continued use, but they may be readily regenerated or reactivated by washing with an acidic material such as dilute acid and thereafter water-washed prior to further use.

The ethers which may be used in this reaction include both those of the symmetrical and unsymmetrical types, although the symmetrical type ethers are to be preferred as reactants since the ester products obtained therefrom will generally all be of the same molecular formula, while the products obtained by reaction between an unsymmetrical type ether and an acid will be mixtures in which the alkoxy group of the ester may be either of the two fragments obtainable from the unsymmetrical ether. Included in the symmetrical type ethers which can be used are dimethyl ether, diethyl ether, di-n-propyl ether, diisopropyl ether, di-n-butyl ether, and dibenzyl ether. Among the unsymmetrical ethers which may, if desired, be used, are methyl ethyl ether, ethyl propyl ether, methyl amyl ether, mixed amyl ethers, ethyl tertiary butyl ether, isopropyl tertiary butyl ether, and methyl tertiary butyl ether. It is also possible to use ethers in which only one-half of the ether molecule can react to give an ester.

The acids which may be used for making esters from ethers include a wide variety of both mono-basic and polybasic acids. Acids which may be used include formic acid, acetic acid, propionic acid, butyric acid, isobutyric acid, valeric acid, caproic acid, capric acid, benzoic acid, furoic acid, the toluic acids, oxalic acid, malonic acid, succinic acid, glutaric acid, adipic acid, and the various phthalic acids. As a general rule, it is more economical to use as reactants in this novel reaction ethers and acidic reactants having from 2 to 12 carbon atoms.

The temperatures which are most useful are of relatively low range, particularly when considered in view of the usual high temperatures required for ether reactions, as well as for known reactions in which esters are formed. Thus, temperatures of 40°–125° C. are found to be quite satisfactory for obtaining good yields of ester products but higher temperatures up to 200° C. may be used depending upon the stability of the resin and the stability of the ether. The time required for the reaction is, of course, dependent upon the temperature used as well as upon the exact ion exchange catalyst. The time should not be long enough to degrade the formed ester product to olefin and organic acid. The time required will generally vary inversely with the temperature. Both these variables are related to the exact extent of reaction required during any one contacting period of the reactants with the ion exchange catalyst.

The reaction using the cation exchange catalyst can be carried out by contacting the ether, the acid, and the resin catalyst in a heated vessel provided with means for insuring vigorous agitation. It may sometimes be necessary to provide suitable pressure maintenance devices in case the ether used is of the low boiling type which would be normally a vapor at the reaction temperature, unless pressure is used within the reactor. After the period of time required for completing the reaction, the reactor contents are removed and the products therefrom are separated by any suitable means for separating liquid and solid, such as by filtration or by simple decantation, to remove the solid ion exchange catalyst from the liquid products. If desired, a fractional distillation of the resulting liquid reaction product may be carried out to facilitate the isolation of the pure ester and recover unreacted acid reactant.

In case the ether is a low boiling compound, the pressure used in the reactor should be sufficient to maintain the ether in a liquid phase at the chosen operating temperature. Pressures may vary from slightly above atmospheric pressure to 750 p. s. i. g.

The mole ratio of ether to acid may vary from 1:2, the stoichiometric proportion appropriate for the use of a symmetrical ether, to 5:1 or 1:5, thus an excess of either reactant may be employed. In case an ether is being used which will result in only one mole of an alcohol equivalent per mole of ether, the stoichiometric proportions of the reactants will be 1:1. Furthermore, if there is more than one carboxyl group per molecule of acid used, suitable adjustment in mole ratios must be made. The catalyst may be separated readily and completely from the liquid reaction products by filtration and may be used repeatedly in subsequent reactions without regeneration or other treatment.

One modification by which the reaction may be carried out is the enclosure of the solid catalyst in a reactor such as a tube which is maintained at the desired reaction temperature while the reactants are allowed to pass through the tube, remaining therein for a sufficient period of time for the desired degree of reaction to take place.

Another modification consists in continuously passing a mixture of organic acid and ether through a vessel containing an acid ion exchange catalyst which is in continuous motion. Reaction is completed in the presence of the resin, the resin is allowed to settle and a clear product is taken overhead as a liquid or vapor stream.

Still another modification consists in heating the reactants in the presence of the resin in a reaction vessel surmounted by a fractionation column. The water formed is taken overhead as an azeotrope with the ether and the ether returned to the reaction zone. This operation may be conducted under pressure. It may also be conducted with a stirred reaction mixture and on a continuous basis.

The particle size of the solid catalyst used for the reaction will vary considerably, depending upon the exact mode of carrying out the operation. Mesh sizes of from 20 to 50 have been used. Larger and smaller mesh sizes may be used depending upon the equipment and the materials being converted. The size of the surface of the particles which are exposed is of importance in determining the speed and completeness of the reaction and is thereby related to the temperature and time of the reaction. If it is so desired, the catalyst material may be prepared by bonding the original catalytic resin with a suitable binder such as a phenol-formaldehyde resin, after which the solid so formed may be crushed to the desired size. Porosity and high surface area should be maintained at a maximum in conjunction with the necessity of obtaining required mechanical strength.

In conjunction with the synthetic ion exchange resin catalysts which are used as catalysts in this process, there may frequently be used to advantage, traces of acid catalysts such as sulfuric acid, phosphoric acid, hydrobromic acid, hydrochloric acid, hydrofluoric acid, sulfurous acid. The use of these acid catalysts may be of advantage when very special catalyst mixtures are wanted for the manufacture of some esters, for example, those of higher molecular weights, and such catalysts will prove to be especially desirable when it is desired to keep the reaction within a given limited period of reaction time.

Although for one-time use these cation exchange catalysts are more expensive than sulfuric, hydrochloric, or sulfonic acid catalysts, normally employed in reactions of ethers with acids, catalysis by these insoluble materials greatly simplifies operational procedure as well as many product purification problems, especially with high boiling or viscous compounds. The removal of the usual type acid catalysts from such products often involves a troublesome neutralization and filtration procedure. Furthermore, failure to remove acid catalysts to a fairly complete degree generally results in excessive decomposition during the subsequent separation or purification of the reaction products. However, the use of cation exchangers as catalysts makes it possible to remove the catalysts by decantation or simple filtration without harm to the reaction products. It is even possible in certain instances to distill the ester products directly in the presence of the cation exchanger catalysts without harm to the ester. In addition, the use of acid regenerated cation exchangers permits the reaction of acid-sensitive compounds which may resinify or form tars when subjected to organic reactions.

The following examples will serve to illustrate the novel process in detail. All parts are by weight unless otherwise stated.

EXAMPLE I

A synthesis was carried out using as the cation exchange catalyst a dry pretreated phenol-formaldehyde sulfonic acid resin which is obtainable commercially as a black solid material. The phenol-formaldehyde sulfonates have the sulfonic acid group attached to the benzene nucleus through a methylene group. The resin as obtained commercially was refluxed with benzene in order to remove the 40% water which was incorporated in the resin. After thus removing the water, the resin was separated from the major portion of the benzene and thereafter heated on a steam plate to remove the residual benzene. About 110 parts of the water-free resin was placed in a steel bomb type reactor, together with 120 parts of glacial acetic acid and 102 parts of isopropyl ether. This reaction mixture was heated for 58 hours at 100° C. After the reaction time had elapsed, the bomb was permitted to cool and a liquid reaction mixture was decanted from the solid resin. The liquid reaction mixture was distilled to obtain, first the unreacted ether, and then the isopropyl acetate. Acetic acid was left as a residue. The good yield of ester so obtained (69 parts) is considered to be at least in part the result of the elimination of side reactions when employing solid ion exchange resins rather than other types of catalytic agents. The ester was purer than the isopropyl acetate obtained commercially as evaluated by saponification number and boiling point range.

EXAMPLE II

In order to establish that the ion exchange resin used in Example I actually was the catalyst functioning to give the reaction obtained, a second experiment was carried out. In this experiment, 120 parts of glacial acetic acid was mixed with 102 parts of isopropyl ether and this mixture heated for 58 hours at 100° C. No catalyst was used. This second experiment was in every way similar to that carried out in Example I, except that no ion exchange resin was used which might have catalytic activity. At the end of the experiment, the liquid mixture was removed from the bomb and distilled. No ester product was obtained, only ether and acetic acid being detected at the end of the distillation.

In another experiment, a mixture of isopropyl ether and acetic acid was heated to a much higher temperature, that is, 250° C., in an effort to obtain a non-catalytic reaction. It was found that a maximum yield of 4% of the expected ester could be obtained. Thus it is clear that in order to obtain satisfactory ester yields, it is necessary to employ the cation exchange resins which have been found to be novel catalysts for the reaction between ethers and organic acids. In the absence of catalyst, ethyl ether and propionic acid produced no ester at 275° C.

EXAMPLE III

In each of the experiments shown in the table, the ether and organic acid indicated were reacted in the presence of the resin for the period of time and at the temperatures illustrated to give the ester product. The reactions were carried out in a similar fashion as those described in Example I, the ether and organic acid being shaken together in a bomb type reactor with the acid resin catalyst. At the end of the indicated reaction period, the liquid reaction product was removed by decantation from the resin particles and the ester worked up by distillation of the liquid products or determined by analysis of the liquid products.

*Table*

| Run No. | Organic Acid | Ether | Resin | Time, Hrs. | Temp., °C. | Ester Yield, Mol Percent |
| --- | --- | --- | --- | --- | --- | --- |
| 1 | Acetic | Diisopropyl | [1] A | 58 | 100 | 26 |
| 2 | do | Diethyl | [2] B | 16 | 120 | 20 |
| 3 | Propionic | do | B | 16 | 120 | 34 |
| 4 | Acetic | Diisopropyl | B | 4 | 125 | 51 |
| 5 | do | do | B | 4 | 125 | 59 |

[1] Phenol-formaldehyde sulfonate in which the sulfuric acid group is attached to the benzene nucleus through a methylene group.
[2] Nuclear sulfonated resin in which the sulfonic acid group is attached directly to the benzene ring. Experiments 4 and 5 were carried out with nuclear sulfonated resins from different sources.

In this series of reactions, the reaction between benzoic acid and n-butyl ether to yield the ester, n-butyl benzoate was accomplished in the presence of sulfonated coal as a catalyst.

EXAMPLE IV

Isopropyl acetate was prepared from 1 mole of diisopropyl ether and 4 moles of acetic acid in the presence of a nuclear sulfonated phenol-formaldehyde resin by refluxing together the reactants and simultaneously removing the water formed during the reaction by entrainment with isopropyl ether. The isopropyl ether so removed was separated from the water-ether mixture and returned to the reaction zone.

Due to the fact that the esters, made by this process, are quite pure and are of good color and odor, they are valuable in the preparation of lacquer, enamels and for use as solvents for various chemical products.

What is claimed is:

1. A novel process for the preparation of esters which comprises reacting an ether with a lower aliphatic carboxylic acid in the presence of a cationic exchange resin substantially freed of water whereby the ester is produced.

2. A novel process for the preparation of esters which comprises reacting an ether and a lower aliphatic carboxylic acid in the presence of a water-free acidic exchange resin at temperatures of 40°–125° C., whereby the corresponding ester is formed, thereafter separating the solid cationic exchange resin from the liquid reaction products containing the organic ester.

3. A novel process which comprises reacting an ether and a lower aliphatic carboxylic acid in the presence of a water-free solid acidic ion exchange resin as catalyst at temperatures of 40°–125° C., separating the solid resin catalyst from the liquid reaction products, and isolating the organic ester from the said liquid reaction products.

4. A processs such as that described in claim 3 in which the ether and the acid reactants each contain from 2 to 12 carbon atoms.

5. A novel process for the preparation of esters which comprises contacting an ether with a lower aliphatic carboxylic acid in the presence of a water-free cationic exchange resin containing sulfonic acid groups, said resin being substantially insoluble in the reactants, and thereafter isolating the liquid organic products containing the ester from the resin catalyst.

6. A process such as that described in claim 5 in which a temperature of 40°–125° C. is maintained throughout the reaction.

7. An improved process for the preparation of isopropyl acetate which comprises contacting the diisopropyl ether and acetic acid in the presence of a water-free cationic exchange resin consisting essentially of a phenol-formaldehyde sulfonate resin at a temperature in the range of 100°–125° C., decanting the liquid reaction products from the phenol-formaldehyde sulfonate resin, and distilling the said liquid reaction products to isolate the pure ester product therefrom.

8. An improved process for the preparation of ethyl propionate which comprises contacting diethyl ether and propionic acid in the presence of a water-free cationic exchange resin consisting essentially of a nuclear sulfonated resin at a temperature of approximately 120° C., decanting the liquid reaction products from the sulfonated resin, and distilling the said liquid reaction products to isolate the pure ester product therefrom.

9. An improved process for the preparation of isopropyl acetate which comprises contacting diisopropyl ether and acetic acid in the presence of a water-free cationic exchange resin consisting essentially of a nuclear sulfonated resin at a temperature of approximately 125° C., decanting the liquid reaction products from the sulfonated resin, and distilling the said liquid reaction products to isolate the pure ester product therefrom.

10. An improved process for the preparation of ethyl acetate which comprises contacting diethyl ether and acetic acid in the presence of a water-free cationic exchange resin consisting essentially of a nuclear sulfonated resin at a temperature of approximately 120° C., decanting the liquid reaction products from the sulfonated resin and distilling the said liquid products to isolate the pure ester product therefrom.

11. An improved process for the preparation of esters which comprises contacting an ether and a lower aliphatic carboxylic acid in the presence of an acidic ion exchange resin at temperatures of 40–125° C., said resin having been preliminarily dehydrated, separating the water formed as an ether-water azeotrope, returning the separated ether to the reaction mixture, and separating the liquid ester product from the resin.

12. An improved process for the preparation of isopropyl acetate which comprises refluxing a mixture of diisopropyl ether and acetic acid in the presence of an acidic ion exchange resin preliminarily dehydrated and thereafter separating the liquid ester product from the resin.

13. An improved process for the preparation of isopropyl acetate which comprises contacting diisopropyl ether and acetic acid in the presence of an acidic ion exchange resin consisting essentially of a water-free nuclear sulfonated resin at temperatures of 40–125° C., separating the water formed as an isopropyl ether-water azeotrope, returning the separated isopropyl ether to the reaction mixture, and separating the liquid ester product from the resin.

14. An improved process for the preparation of isopropyl acetate which comprises contacting diisopropyl ether and acetic acid in the presence of a water-free cationic exchange resin consisting essentially of a nuclear sulfonated resin at a temperature of approximately 125° C., separating the water formed as an isopropyl ether-water azeotrope, returning the separated isopropyl ether to the reaction mixture and separating the liquid ester product from the resin.

DELMER L. COTTLE.
DAVID W. YOUNG.

REFERENCES CITED

The following references are of record in the file of this patent:

UNITED STATES PATENTS

| Number | Name | Date |
|---|---|---|
| 2,030,835 | Cox et al. | Feb. 11, 1936 |
| 2,475,629 | Meincke | July 12, 1949 |

FOREIGN PATENTS

| Number | Country | Date |
|---|---|---|
| 308,582 | Great Britain | May 1, 1930 |

OTHER REFERENCES

Sussman: Ind. Eng. Chem., vol. 38, pp. 1228–1230 (1946).

Groggins: "Unit Processes in Organic Syntheses" (McGraw-Hill, N. Y., 1947), 3rd ed., p. 629.